United States Patent

[11] 3,576,472

| [72] | Inventor | John F. Marshall, III |
| --- | --- | --- |
| | | Hermitage, Tenn. |
| [21] | Appl. No. | 722,304 |
| [22] | Filed | Apr. 18, 1968 |
| [45] | Patented | Apr. 27, 1971 |
| [73] | Assignee | Aladdin Industries, Incorporated |
| | | Chicago, Ill. |

[54] DEVICE FOR SENSING FLOWABLE MATERIAL
15 Claims, 2 Drawing Figs.

[52] U.S. Cl. .................................................. 317/132,
73/15, 73/362, 317/148.5, 317/153
[51] Int. Cl. ............................................... H01h 47/26
[50] Field of Search .......................................... 73/15
(Conductivity), 362 (R); 317/132

[56] References Cited
UNITED STATES PATENTS

| 3,114,082 | 12/1963 | Weise | 317/132 |
| --- | --- | --- | --- |
| 3,182,222 | 5/1965 | Lacy et al. | 317/132X |
| 3,222,578 | 12/1965 | Thiele | 317/132X |
| 3,295,353 | 1/1967 | Hagen | 73/362 |

Primary Examiner—Lee T. Hix
Attorney—McDougall, Hersh, Scott and Ladd

ABSTRACT: A device for sensing the presence or absence of a flowable material in response to the thermal conductivity thereof, comprising a probe including first and second thermistors adapted to be surrounded by flowable material, energizing means for energizing said first thermistor with sufficient power to cause substantial heating thereof, said energizing means including means for supplying said second thermistor with a small amount of power insufficient to cause substantial heating thereof, said second thermistor affording a reference resistance responsive to the ambient temperature of the flowable material, a cycle timer connected to said energizing means for alternately energizing and deenergizing said first thermistor, said first thermistor being energized for a heating cycle and then deenergized for a cooling cycle, a comparator comprising a differential amplifier for comparing the voltages across said first and second thermistors, a trigger device connected to said differential amplifier and having first and second outputs which are activated alternately in accordance with whether the resistance of said first thermistor is above or below a predetermined control point, first and second gates connected to said first and second outputs, a delay timer connected to said cycle timer and including a pulse generator for generating a momentary pulse after a predetermined delay from the beginning of said heating cycle, means for supplying said momentary pulse to said gates to actuate said gates, a memory device having first and second inputs connected to said gates, said memory device being operable alternately to first and second states in response to pulses from said gates, and means including an output relay connected to said memory device to indicate the state of said memory device.

Patented April 27, 1971 3,576,472

INVENTOR
John F. Marshall, III
by McDougall, Hersh, Scott
and Ladd
Attys

DEVICE FOR SENSING FLOWABLE MATERIAL

This invention relates to a device for sensing the presence or absence of flowable materials. The device utilizes the general principle of providing a probe adapted to be immersed in the flowable material, and utilizing the probe to respond to the thermal conductivity of the material around the probe. If flowable material is around the probe, the thermal conductivity will be different from the conductivity when only air is around the probe. Such devices are particularly useful as level indicators or controllers for storage bins and processing apparatus adapted to hold flowable materials.

Difficulties have been experienced in the past when detecting the presence of certain flowable materials, such as powders and pellets having low thermal conductivity. The thermal conductivity of such materials differs only slightly from that of air. The present invention is concerned with the problem of providing reliable indications of the presence or absence of such materials having low thermal conductivity.

Generally speaking, the thermal conductivity responsive device of the present invention comprises a probe including a first thermistor and preferably also a second thermistor. The probe is adapted to be surrounded by flowable material, the thermal conductivity of which is a factor in the operation of the device. A substantial amount of electrical power is supplied to the first thermistor, so as to cause heating of the thermistor. When the thermistor is heated in air, the thermistor soon reaches a stable temperature, at which the thermistor has a certain resistance. When the flowable material rises to a level such that it surrounds the probe, heat is conducted away from the thermistor by the flowable material, with the result that the temperature of the thermistor is reduced. Accordingly, the resistance of the thermistor is increased. The second thermistor provides a reference resistance which is responsive to the ambient temperature of the flowable material. The second thermistor is supplied with only a very small amount of electrical power, insufficient to cause substantial heating of the second thermistor. The device of the present invention is adapted to compare the resistance of the first and second thermistors, so as to obviate errors due to changes in the ambient temperature.

In accordance with another feature of the present invention, the first thermistor is not energized continuously, but rather is alternately energized and deenergized, so that the thermistor is operated through a heating cycle, followed by a cooling cycle. A cycle timer is provided to cause such cyclical energization of the thermistor. This system avoids continuous or sustained heating of the flowable material around the first thermistor. It has been found that any such continuous heating of materials having low thermal conductivity tends to cause the temperature of the thermistor to rise gradually, so that the resistance of the thermistor may reach a value virtually the same as the value obtained when the probe is surrounded by air. Thus, such continuous heating of the thermistor tends to cause false indications of the absence of the flowable material, when actually the flowable material is still present, but has been heated to a high temperature by the thermistor, in the region immediately surrounding the thermistor. By providing cooling cycles between the successive heating cycles, the device of the present invention obviates any such false indications.

The resistances of the first and second thermistors are preferably compared by a differential amplifier. The output of the differential amplifier is preferably connected to a trigger device having two outputs. One output is activated if the voltage across the first thermistor is above the desired control point, while the other output is activated if the voltage is below the control point.

It is preferred to compare the resistances during the heating cycle of the first thermistor, but after a predetermined delay from the beginning of the heating cycle. The comparison is then preferably taken during a brief interval, before the cooling cycle begins. To accomplish this mode of operation, the device of the present invention preferably comprises a delay timer which actuates a pulse generator after a predetermined interval from the beginning of the heating cycle. The momentary pulse from the pulse generator is supplied to first and second gates connected to the first and second outputs of the trigger device. The outputs from the gates are preferably connected to the first and second inputs of the memory device. When the memory device receives a pulse from the first gate, the memory device is switched to a first state. If the memory device is already in the first state, it remains in the first state. When the memory device receives a pulse from the second gate, it is switched to the second state. If it is already in the second state, the memory device remains in the second state.

An output device is preferably provided to indicate the state of the memory device. The output device preferably comprises a relay which is energized when the memory device is in one state, while being deenergized when the memory device is in the other state. The contacts of the relay may be employed to operate signaling devices, and also to control conveyors, feeders or other machinery for raising or lowering the level of the flowable material around the probe. Thus, the device of the present invention may be employed for automatically regulating the level of the flowable material.

Various other objects, advantages and features of the present invention will appear from the following description, together with the accompanying drawings, in which.

Figure 2:
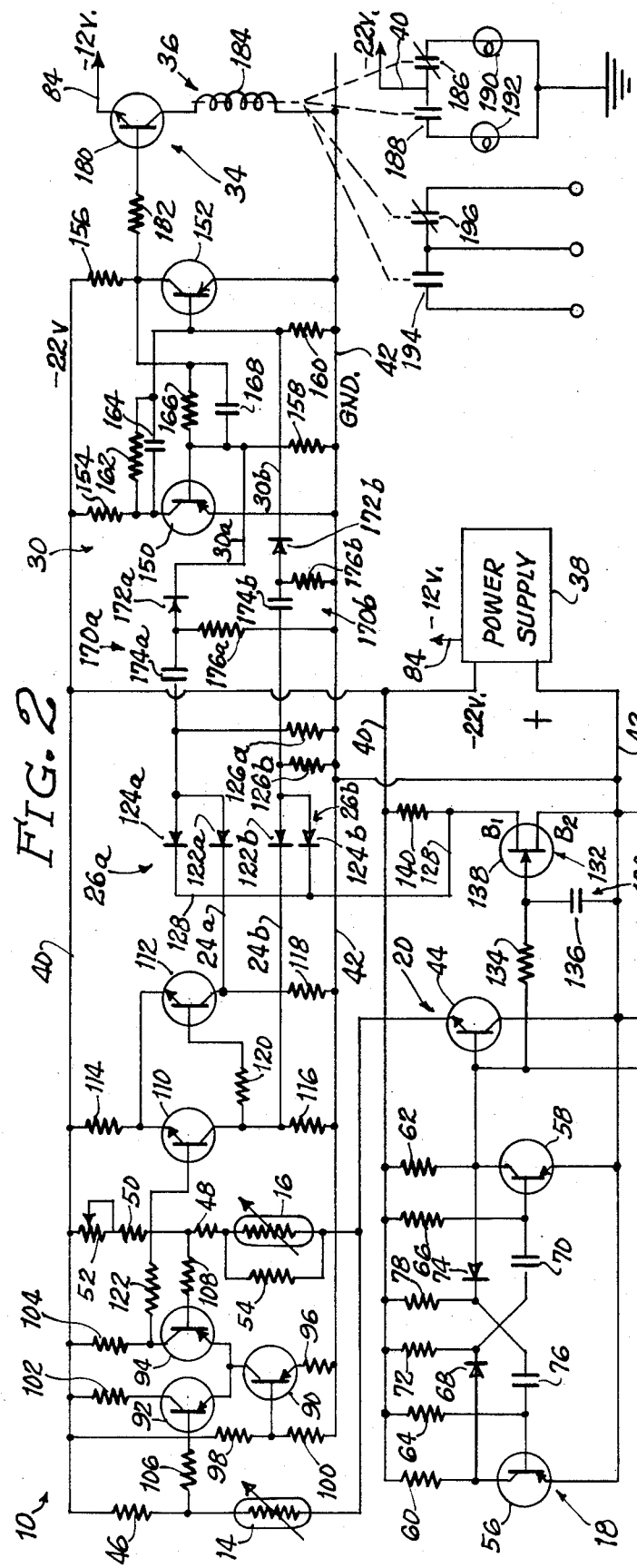
FIG. 2 is a schematic circuit diagram of the device.
Figure 1:
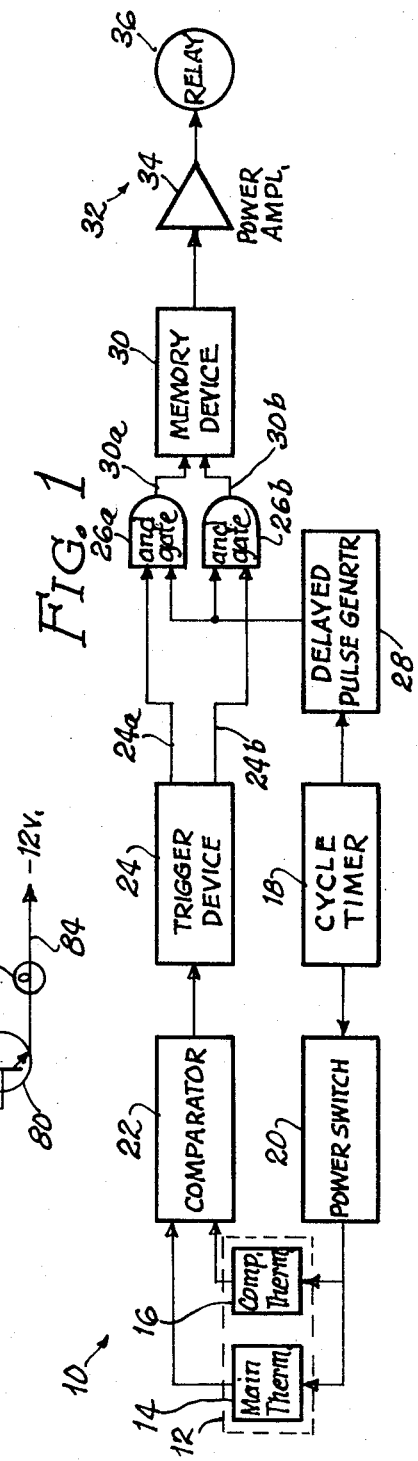
FIG. 1 is a schematic block diagram of a thermal conductivity detecting device to be described as an illustrative embodiment of the present invention.

As just indicated, FIGS. 1 and 2 illustrate a device 10 for sensing the presence or absence of a flowable dry powder or other material, by employing the thermal conductivity of the material. The device 10 comprises a probe 12, adapted to be immersed in the material. The probe 12 includes a main thermistor 14, and preferably also a second or compensating thermistor 16. The thermistors 14 and 16 are of the known type, having a negative coefficient of resistance change, with changing temperature. Thus, the resistance of each thermistor decreases with increasing temperature.

Instead of being energized continuously, the thermistors 14 and 16 are preferably operated through alternating heating and cooling cycles. For this purpose, the device 10 comprises a cycle timer 18, preferably of the electronic type. The timer 18 controls a power switch 20, through which the thermistors 14 and 16 are cyclically energized. The switch 20 is preferably of the electronic type.

A comparator 22 is provided to compare the resistances of the main thermistor 14 and the compensating thermistor 16. As will be described in detail presently, the comparator 22 may comprise a differential amplifier, adapted to compare the voltages across the thermistors 14 and 16. The output of the comparator 22 is connected to a trigger device 24 having two output lines 24a and 24b. When the voltage across the main thermistor 14 is above the desired control point, one of the outputs is supplied with a signal. When the voltage is below the control point, the other output is supplied with the output signal.

It is preferred to sample the output signals from the trigger device 24 for only a brief interval, during the heating cycle, but delayed from the beginning thereof, to afford an opportunity for the main thermistor 14 to be heated by the electrical power supplied thereto. The temperature reached by the main thermistor 14 is dependent upon the thermal conductivity of the material around the probe 12.

To achieve this sampling action, the outputs 24a and 24b of the trigger device 24 are connected to first and second gates 26a and 26b. As shown, the gates 26a and 26b are of the AND type and are controlled by a pulse from a delayed pulse generator 28. As will be described in detail presently, the pulse generator 28 comprises a delay timer connected to the output of the cycle timer 18, and a pulse generating device, controlled by the delay timer and adapted to produce a momentary pulse after a predetermined delay, from the beginning of the heating cycle.

The outputs of the AND gates 26a and 26b are fed to a memory device 30 having first and second input lines 30a and 30b. The memory device 30 has two operating states. One state is assumed or maintained when a pulse is received from the first gate 26a. The other state is assumed or maintained when a pulse is received from the second gate 26b. Thus, the state of the memory device 30 indicates whether the voltage across the main thermistor was above or below the control point at the time of the most recent sampling pulse.

The state of the memory device 30 is indicated by an output device 32, preferably comprising a power amplifier 34 adapted to energize a relay 36. Thus, the relay 36 is energized when the memory device 30 is in one state, while being deenergized when the memory device is in the other state. The relay 36 may be employed to control signaling devices such as lamps or the like. Moreover, the relay may be utilized to control the operation of conveyors or feeders adapted to change the level of the flowable material around the probe 12. Thus, the device 10 may be employed to raise the level of the flowable material if the material drops below the level of the probe 12. Alternatively, the device may be employed to lower the level of the flowable material, if the material rises around the probe.

The details of the device 10 are illustrated schematically in FIG. 2. The thermistors 14 and 16 are adapted to be energized by a power supply 38 including negative and positive supply lines 40 and 42. In this case, the positive supply line 42 is grounded. The power supply 38 may deliver 22 volts, or any other suitable voltage, between the supply lines 40 and 42.

The power switch 20 preferably comprises a transistor 44 having its collector connected to the positive supply line 42. One side of the thermistor 14 is connected through a current-limiting resistor 46 to the negative supply line 40. The other side of the thermistor 14 is connected to the emitter of the transistor 44. Thus, when the transistor 44 is conductive, the thermistor 14 is energized through the resistor 46. Substantial power is supplied to the thermistor 14 so as to cause heating of the thermistor.

One side of the compensating thermistor 16 is connected to the negative supply lead 40 through resistors 48, 50 and 52, connected in series. The resistor 52 is preferably variable. Still another resistor 54 is preferably connected in parallel with the thermistor 16. The other side of the thermistor 16 is connected to the emitter of the transistor 44. Thus, when the switching transistor 44 is conductive, the thermistor 16 is energized. However, the power supplied to the thermistor 16 is quite small, insufficient to cause substantial heating of the thermistor. As already indicated, the thermistor 16 provides a reference resistance, responsive to variations in ambient temperature of the material around the probe 12.

The cycle timer 18 is preferably of the electronic type and is adapted to control the switching transistor 44 so that it will be alternately conductive and nonconductive. As shown, the cycle timer 18 comprises a free-running multivibrator comprising transistors 56 and 58. Those skilled in the art will be familiar with various multivibrator arrangements. As shown, the emitters of both transistors 56 and 58 are connected to the positive supply line 42. Collector resistors 60 and 62 are connected between the negative supply line 40 and the collectors of the transistors 56 and 58. Base resistors 64 and 66 are connected between the negative supply line 40 and the bases of the transistors 56 and 58. In this case, a diode 68 and a timing capacitor 70 are connected in series between the collector of the transistor 56 and the base of the transistor 58. A resistor 72 is connected between the negative supply line 40 and the junction of the diode 68 and the capacitor 70. Similarly a diode 74 and a capacitor 76 are connected in series between the collector of the transistor 58 and the base of the transistor 56. A resistor 78 is connected between the negative supply line 40 and the junction of the diode 74 and the capacitor 76.

In the illustrated cycle timer 18, the transistor 56 conducts during the cooling cycle of the thermistor 14, while the transistor 58 is conductive during the heating cycle. When the transistor 58 is conductive, the capacitor 76 charges through the transistor 58, the diode 74, and the resistor 64. Meanwhile the other capacitor 70 discharges through the resistor 72 and the emitter-base path of the transistor 58. The charging of the capacitor 76 eventually causes the base of the transistor 56 to go sufficiently negative to render the transistor 56 conductive. The transistor 58 is then rendered nonconductive as the capacitor 70 is charged through the transistor 56, the diode 68, and the resistor 66. Meanwhile the capacitor 76 discharges through the resistor 78 and the emitter-base path of the transistor 56.

It will be understood that the values of the resistors and capacitors may be varied so as to provide various timing cycles. In accordance with one suitable timing cycle, for example, the transistor 58 is conductive for about 18 seconds to provide the heating cycle. The transistor 56 is then conductive for about 45 seconds, while the transistor 58 is nonconductive, to provide the cooling cycle of the thermistor 14.

In this case, the voltage at the collector of the transistor 58 is used to control the switching transistor 44. The base of the transistor 44 is connected directly to the collector of the transistor 58. When the transistor 58 is conductive, the collector voltage is nearly zero, so that the transistor 44 is conductive. When the transistor 58 is nonconductive, the collector voltage is at or near the maximum negative voltage of the supply line 40, with the result that the transistor 44 is nonconductive.

If desired, another transistor 80 may be employed to control a signal lamp 82. As shown, the collector of the transistor 80 is connected to the positive supply lead 42. The lamp 82 is connected between the emitter and the negative supply lead 84 extending from the power supply 38. The negative supply line 84 may be at a lower voltage, such as 12 volts, or any other suitable voltage. As shown, the base of the transistor 80 is connected directly to the collector of the transistor 58.

As illustrated, the comparator 22 is in the form of a differential amplifier, adapted to compare the voltages across the thermistors 14 and 16. As shown, the comparator or differential amplifier 22 comprises three transistors 90, 92 and 94. The transistor 90 is connected in a constant current regulating circuit. The constant current through the transistor 90 is divided between the transistors 92 and 94 in a variable manner, in accordance with the relative voltages across the thermistors 14 and 16.

Thus, the emitter of the transistor 90 is connected to the positive supply line 42 through a negative feedback resistor 96. The base of the transistor 90 is biased by a voltage divider, comprising resistors 98 and 100, connected in series between the supply lines 40 and 42. The base is connected to the junction of the resistors 98 and 100.

The emitters of both transistors 92 and 94 are connected to the collector of the transistor 90. Collector resistors 102 and 104 are connected between the negative supply line 40 and the collectors of the transistors 92 and 94.

It will be seen that the base of the transistor 92 is connected through a resistor 106 to the junction between the thermistor 14 and its load resistor 46. Similarly, the base of the transistor 94 is connected through a resistor 108 to the junction between the resistors 48 and 50 in the load circuit for the compensating thermistor 16.

Any change in the resistance of the main thermistor 14 changes the voltage at the base of the transistor 92. As a result, the collector currents in both transistors 92 and 94 are changed differentially, because the constant current through the transistor 90 is necessarily divided between the transistors 92 and 94. For example, a decrease in the resistance of the main thermistor 14 decreases the negative voltage at the base of the transistor 92. As a result, the collector current of the transistor 92 is decreased, while the collector current of the transistor 94 is increased. The opposite action occurs in response to any increase in the resistance of the thermistor 14. Similarly, changes in the resistance of the compensating thermistor 16 produce changes in the collector currents of both transistors 92 and 94. For example, any increase in the resistance of the compensating thermistor 16 increases the negative voltage at the base of the transistor 94, so as to increase the collector current in the transistor 94, while decreasing the collector current in the transistor 92.

The trigger device 24 translates the continuously variable output signal of the differential amplifier 22 into On and Off signals, indicating whether the main thermistor 14 is above or below the desired control point. The illustrated trigger device 24 is in the form of a modified Schmitt type trigger, comprising two transistors 110 and 112, only one of which is conductive at any one time. In the illustrated arrangement, the emitters of both transistors 110 and 112 are connected through a common emitter resistor 114 to the negative supply line 40. Collector resistors 116 and 118 are connected between the positive supply line 42 and the collectors of the transistors 110 and 112. The collector voltage of the transistor 110 is applied to the base of the transistor 112 through a coupling resistor 120. The output of the differential amplifier 22 is applied to the trigger device 24 through a resistor 122, connected between the collector of the transistor 94 and the base of the transistor 110.

When the voltage at the collector of the transistor 94 becomes more negative than the desired control point, the transistor 110 is rendered nonconductive. For example, the control point voltage may be −17 volts. When the transistor 110 is nonconductive, its collector voltage drops to zero, with the result that the transistor 112 becomes conductive.

When the negative voltage at the collector of the transistor 94 drops appreciably below the control point, the transistor 110 becomes conductive, while the transistor 112 becomes nonconductive. Thus, for example, this action may occur when the negative voltage at the collector of the transistor 94 drops to −15 volts.

The collectors of the transistors 110 and 112 act as the two outputs 24a and 24b which are energized alternatively, as previously described. The signals at the two outputs indicate whether the resistance of the main thermistor 14 is above or below the desired control point. When the resistance of the thermistor 14 is below the control point, the transistor 110 is conductive. When the resistance of the thermistor 14 is above the control point, the transistor 112 is conductive.

As previously indicated, the outputs 24a and 24b are connected to the memory device 30 through the AND gates 26a and 26b. In the illustrated construction, the AND gate 26a comprises two diodes 122a and 124a. Similarly, the AND gate 26b comprises diodes 122b and 124b. It will be seen that a common output resistor 126a is connected between the positive supply line 42 and the anodes of both diodes 122a and 124a. The cathode of the diode 122a is connected to the output lead 24a which runs directly to the collector of the transistor 112. Similarly, the common output resistor 126b is connected between the positive supply line 42 and the anodes of both diodes 122b and 124b. The cathode of the diode 122b is connected to the output lead 24b which runs to the collector of the transistor 110.

The cathodes of the diodes 124a and 124b are connected to a common lead 128 which is adapted to be supplied with pulses by the pulse generator 28. It will be recalled that a momentary sampling pulse is produced during each heating cycle of the thermistors 14 and 16. The pulse is delayed by a predetermined interval after the beginning of the heating cycle.

The illustrated pulse generator 28 comprises a delay timer 130 and a trigger device 132. It will be seen that the delay timer 130 comprises a resistor 134 and a capacitor 136, connected in series between the collector of the transistor 58 and the positive supply line 42. The capacitor 136 is charged through the resistors 62 and 134 when the transistor 58 is nonconductive. Such charging results in a negative voltage across the capacitor 136. When the transistor 58 is conductive, the capacitor 136 discharges through the resistor 134 and the transistor 58. The slow discharging of the capacitor 136 provides the delay timing.

The illustrated trigger device 132 comprises a unijunction transistor 138. It will be seen that the positive supply line 42 is connected to the second base terminal of the transistor 138. The emitter of the transistor 138 is connected to the junction of the capacitor 136 and the resistor 134. The first base terminal of the transistor 138 is connected through a load resistor 140 to the negative supply line 40. As shown, the control line 128, leading to the gates 26a and 26b, is connected to the first base terminal of the unijunction transistor 138.

At the end of the cooling cycle, the capacitor 136 is charged so that a high negative voltage is produced between the emitter and the second base terminal of the transistor 138. Consequently, the transistor 138 is nonconductive. During the heating cycle, the capacitor 136 discharges through the resistor 134 and the transistor 58. After the desired delay, the negative voltage across the capacitor 136 drops to the control point of the unijunction transistor 138, which may be about −10 volts, for example. The transistor 138 then becomes conductive, with the result that the capacitor 138 is recharged through the resistor 140 and the path between the emitter and the first base terminal of the transistor. The recharging of the capacitor increases the negative emitter voltage to such an extent that the transistor 138 again becomes nonconductive. The momentary conduction of the transistor 138 produces a momentary pulse on the control line 128. For example, the duration of the pulse may be about 1 millisecond. During the pulse, the voltage on the line 128 goes positive from the negative supply voltage to a low negative voltage. Thus, the pulse may go from −22 volts to −5 volts, and then back to −22 volts, for example.

The effect of each of the AND gates 26a and 26b is to transmit a positive-going pulse when the positive-going sampling pulse is applied to the control line 128. The positive-going output pulses from the gates 26a and 26b are developed across the resistors 126a and 126b. The magnitude of the positive-going output pulses depends upon whether the transistors 110 and 112 are conductive or nonconductive. Thus, in the case of the gate 26a, the positive-going output pulse is large in magnitude if the transistor 112 is nonconductive, while being small if the transistor 112 is conductive. The difference is so great that the small positive-going pulses have no effect and can be disregarded. The action of the gate 26b is the same, in that a large positive-going output pulse is produced if the transistor 110 is nonconductive, while a negligibly small pulse is produced if the transistor is conductive.

The effect of the diodes 122a and 122b employed in the first gate 26a is to transmit the larger of the two negative voltages applied to the cathodes of the diodes. The action of the diodes will be clarified by referring to a specific example. In the example already mentioned, the sampling pulse applied to the control line 128 may go from −22 volts to −5 volts and then back to −22 volts. When the transistor 112 is conductive, this collector voltage may be about −15 volts, for example. When the transistor 112 is nonconductive, this collector voltage is zero. Thus, when the transistor 112 is nonconductive, the sampling pulse, applied to the control line 128, produces a positive-going output pulse corresponding to the sampling pulse and ranging from −22 volts to −5 volts. When the transistor 112 is conductive, the positive-going output pulse is much smaller, ranging from −22 to −15 volts. The action of the other gate 26b is substantially the same. It will be understood that these voltage ranges are mentioned merely by way of example and are subject to wide variation. The memory device 30 has two states, one representing conduction of the transistor 110, and the other representing conduction of the transistor 112. Thus, one state of the memory device 30 represents a condition in which the resistance of the main thermistor 14 is below the control point. The other stage of the memory device 30 represents a condition in which the resistance of the thermistor 14 is above the desired control point.

Various types of memory devices may be employed. The illustrated memory device 30 comprises two transistors 150 and 152 in a bistable flip-flop circuit. As shown, the emitters of both transistors 150 and 152 are connected to the positive supply line 42. Collector resistors 154 and 156 are connected between the negative supply line 40 and the collectors of the transistors 150 and 152. Base resistors 158 and 160 are connected between the positive supply line 42 and the bases of the transistors. It will be seen that a coupling resistor 162 is connected between the collector of the transistor 150 and the base of the transistor 152. A small value capacitor 164 is connected in parallel with the resistor 162. Similarly, a coupling resistor 166 is connected between the collector of the transistor 152 and base of the transistor 150. A small capacitor 168 is connected in parallel with the resistor 166.

The positive-going output pulse of gate 26a is fed to the base of the transistor 150 by a differentiating circuit 170a and a diode 172a. Similarly, a differentiating circuit 170b and a diode 172b are employed between the gate 26b and the base of the transistor 152. The differentiating circuit 170a comprises a small capacitor 174a connected in series with a resistor 176a across the load resistor 126a. The diode 172a is connected from the junction of the capacitor 174a and the resistor 176a to the base of the transistor 150. Similarly, the differentiating circuit 170b comprises a capacitor 174b and a resistor 176b, connected in the same manner. In each case, the differentiating network converts the positive-going pulse into a sharp spike. Each diode transmits the main positive spike while eliminating any negative overshoot.

The positive-going pulses are effective to change the state of the flip-flop memory device 30, if the pulses are applied to the transistor which is conductive. If applied to the nonconductive transistor, the positive-going pulses have no effect. Thus if the transistor 150 is conductive, a positive-going pulse, applied to its base, causes it to become nonconductive, while causing the other transistor 152 to become conductive. If any additional positive-going pulses are applied to the base of the transistor 150, it remains nonconductive. A positive-going pulse, applied to the base of the transistor 152, causes it to become nonconductive.

Thus, the memory device 30 remembers whether the most recent positive pulse was received from the gate 26a or the gate 26b. The state in which the transistor 150 is conductive indicates that the most recent positive pulse was received from the gate 26b. The other state, in which the transistor 152 is conductive, indicates that the most recent pulse was received from the gate 26a.

As previously stated, the state of the memory device 30 is indicated by the output device 32, which includes the power amplifier 34 and the relay 36. As shown, the amplifier 34 comprises a transistor 180. A coupling resistor 182 is connected between the collector of the transistor 152 and the base of the transistor 180. The emitter of the transistor 180 is connected to the negative supply line 84. As shown, the relay 36 includes a coil 184 connected between the positive supply line 42 and the collector of the transistor 180. Thus the relay 36 is energized when the transistor 180 is conductive. The transistor 180 is rendered conductive when the transistor 152 is conductive.

The relay 36 may be arranged to control a variety of signaling devices, conveyors, feeders or the like. As shown, the relay 36 has normally closed contacts 186 and normally open contacts 188, adapted to control signal lamps 190 and 192, which may be energized from the supply lines 40 and 42. The relay 36 also has normally open and normally closed contacts 194 and 196, which may be employed to control conveyors, feeders and other machinery.

It may be helpful to summarize the operation of the device 10. The thermistor probe 12 is adapted to be employed in a bin or the like, for holding a dry flowable material, such as a powder or pellets. The device is capable of indicating whether the level of the flowable material is above or below the probe 12.

The electronic cycle timer 18 provides a heating cycle in which the thermistors 14 and 16 are energized, and a cooling cycle in which the thermistors are deenergized. For example, the heating cycle may last for 18 seconds, while the cooling cycle may last for 40 seconds. During the heating cycle, the transistors 44 and 58 are conductive, while the transistor 56 is nonconductive. During the cooling cycle, the transistor 56 is conductive while the transistors 44 and 58 are nonconductive.

During the heating cycle, the power supplied to the main thermistor 14 is sufficient to cause substantial heating of the thermistor. If the flowable material is at a high level so that the material surrounds the probe 12, the heat from the thermistor 14 is dissipated, so that the thermistor does not become as hot as it does in the absence of the material. Accordingly, the resistance of the thermistor 14 does not drop to so low a value as it does in the absence of the flowable material.

The power supplied to the compensating thermistor 16 is quite small, so that the compensating thermistor is not heated to any substantial extent. The compensating thermistor 16 provides a reference resistance which is responsive to changes in the ambient temperature of the flowable material. The lower power supplied to the compensating thermistor 16 is due to the provision of relatively high resistance in series with the thermistor, and a relatively low value resistor 54 in parallel with the thermistor.

The differential amplifier 22 makes a comparison of the voltages across the thermistors 14 and 16. The action of the differential amplifier 22 is such as to produce a considerable change in output, according to whether the resistance of the main thermistor 14 is above or below the desired control point. The variable resistor 52 in the circuit for the compensating thermistor 16 makes it possible to adjust the control point.

The trigger device 24 converts the continuously variable output from the differential amplifier 22 into two On-Off signals, which are fed into the AND gates 26a and 26b. These two On-Off signals are sampled by the momentary pulses produced by the pulse generator 28. Each momentary pulse is produced during the heating cycle, after a predetermined delay from the beginning of the heating cycle. For example, the delay may be about 15 seconds. The sampling pulse is of brief duration, such as 1 millisecond, for example.

The sampling pulses, combined in the gates 26a and 26b with the On-Off output signals, produce positive-going control pulses to the memory device 30. These positive-going pulses are applied to the bases of the flip-flop transistors 150 and 152. If one of the positive-going pulses is applied to one of the transistors which is in the conductive state, the transistor is rendered nonconductive. If the transistor is already nonconductive, the positive-going pulse has no effect.

The output relay 36 indicates the state of the memory device 30. Thus the relay 36 is energized if the transistor 152 is conductive, but is deenergized if the transistor 150 is conductive.

Thus the device may be arranged so that the relay 36 is energized if the resistance of the main thermistor 14 is above the control point, while being deenergized if the resistance of the main thermistor is below the control point. The condition of the main thermistor is sampled after it has been heated for a certain interval. In this way, the device obviates any error due to continuous heating of the flowable material. Such continuous heating tends to cause errors, because the flowable material around the probe is heated to such a high temperature, that the resistance of the main thermistor may drop to virtually the same value as if the flowable material were absent. The cyclical heating and cooling of the thermistors obviates this problem. Thus reliable results are obtained with all dry flowable materials, even those having extremely low thermal conductivity.

The provision of the compensating thermistor obviates any possible errors due to variations in the ambient temperature of the flowable material. In some cases, the flowable material is at an elevated temperature, due to previous processing or other factors. The compensating thermistor responds to any such elevated ambient temperature and provides a reliable reference, against which the resistance of the main thermistor may be compared.

Those skilled in the art will realize that the values of the components may be varied widely but it may be helpful to offer the following exemplary values:

Resistors

| Number | Ohms |
|---|---|
| 14 | 2 K. at 25° C. |
| 16 | 500 at 25° C. |
| 46 | 330 |
| 48 | 150 |
| 50 | 1 K. |
| 52 | 1 K. variable |
| 54 | 560 |
| 60 | 10 K. |
| 62 | 10 K. |
| 64 | 150 K. |
| 66 | 560 K. |
| 72 | 100 K. |
| 78 | 100 K. |
| 96 | 180 |
| 98 | 20 K. |
| 100 | 470 |
| 102 | 5.1 K. |
| 104 | 5.1 K. |
| 106 | 5.1 K. |
| 108 | 5.1 K. |
| 114 | 560 |
| 116 | 1.8 K. |
| 118 | 1.8 K. |
| 120 | 100 K. |
| 126a | 22 K. |
| 126b | 22 K. |
| 134 | 150 K. |
| 140 | 1 K. |
| 154 | 10 K. |
| 156 | 10 K. |
| 158 | 33 K. |
| 160 | 33 K. |
| 162 | 47 K. |
| 166 | 47 K. |
| 176a | 18 K. |
| 176b | 18 K. |
| 182 | 2.2 K. |

Capacitors

| Number | Microfarads |
|---|---|
| 70 | 250 |
| 76 | 250 |
| 136 | 25 |
| 164 | 0.0005 |
| 168 | 0.0005 |
| 174a | 0.015 |
| 174b | 0.015 |

Various other modifications, alternative constructions and equivalents may be employed without departing from the true spirit and scope of the invention, as exemplified in the foregoing description and defined in the following claims.

I claim:

1. A device for sensing the presence or absence of a material by utilizing the thermal conductivity of the material, comprising the combination of:

a probe including a thermistor adapted to be surrounded by a material, energizing means for selectively supplying sufficient electrical power to said thermistor so as to cause the resistance of said thermistor to be responsive to the heating of said thermistor by said energizing means and the thermal conductivity of the material surrounding the probe, a cycle timer for causing said energizing means to energize said thermistor for a heating cycle and then causing said thermistor to be deenergized for a cooling cycle, and additional means for detecting a change in the resistance of said thermistor at a predetermined time during the cycle of said timer.

2. A device according to claim 1, in which said energizing means comprises a power supply, and an electronic switch connected between said power supply and said thermistor, said cycle timer comprising an electronic timing device for causing said electronic switch to be conductive during said heating cycle and nonconductive during said cooling cycle.

3. A combination according to claim 2, in which said additional means includes a delay device connected to said electronic timing device for actuating said measuring means during said heating cycle after a predetermined delay.

4. A device according to claim 1, in which said additional means comprises a delay timing device operable by said cycle timer during said heating cycle for actuating said additional means after a predetermined delay from the beginning of said heating cycle.

5. A device for sensing the presence or absence of a flowable material by sensing the thermal conductivity of the flowable material, comprising the combination of:

a probe including first and second thermistors adapted to be surrounded by flowable material, energizing means for energizing said first thermistor with sufficient power to cause the resistance of said thermistor to be responsive to the heating thereof whereby the temperature and resistance of said first thermistor will vary in accordance with the thermal conductivity of the flowable material around said probe, and additional means for comparing the resistance of said first thermistor with the resistance of said second thermistor, said second thermistor providing a reference resistance which is responsive to the ambient temperature of said flowable material.

6. A device according to claim 5, in which said additional means comprises additional energizing means for supplying said second thermistor with a small amount of electrical power which is insufficient to cause substantial heating of said second thermistor, and an electronic comparison device for comparing the voltages across said first and second thermistors.

7. A device according to claim 6, in which said electronic comparison device comprises an electronic differential amplifier.

8. A device according to claim 5, including a cycle timer connected to said energizing means for alternately energizing and deenergizing said first thermistor, said first thermistor being energized for a heating cycle and deenergized for a cooling cycle, and means connecting said additional means to said cycle timer whereby said additional means is effective to compare the resistance of said first and second thermistors during said heating cycle.

9. A device according to claim 8, in which said additional means includes a delay timer operable by said cycle timer for momentarily actuating said additional means to compare said resistances after a predetermined delay from the beginning of said heating cycle.

10. A device according to claim 9, in which said delay timer comprises a pulse generator to produce a momentary pulse for causing said additional means to compare said resistances, and a delay device connected to said cycle timer for triggering said pulse generator after a predetermined delay from the beginning of said heating cycle.

11. A device according to claim 10, including additional energizing means for energizing said second thermistor with a small amount of power insufficient to cause substantial heating hereof, said additional means including means for comparing the voltages across said first and second thermistors.

12. A device according to claim 11,
in which said last mentioned means comprises an electronic trigger device having two outputs which are actuated alternately when the voltage across said first thermistor is above or below a predetermined control point relative to the voltage across said second thermistor,
first and second gates connected to said outputs,
and means for supplying said momentary pulse to said gates for momentarily actuating said gates.

13. A device according to claim 12,
including an electronic memory device connected to the outputs of said first and second gates,
said memory device having first and second states which are assumed and maintained in response to signals from said first and second gates.

14. A device according to claim 13,
including an output device connected to said memory device and operable to two different conditions in response to the first and second states of said memory device.

15. A device according to claim 14,
in which said output device comprises a relay which is energized in one state and deenergized in the other state of said memory device.